March 20, 1962         H. C. MILLER         3,025,847
COMPOSITE DIAMOND TOOL
Filed July 11, 1960         3 Sheets-Sheet 1
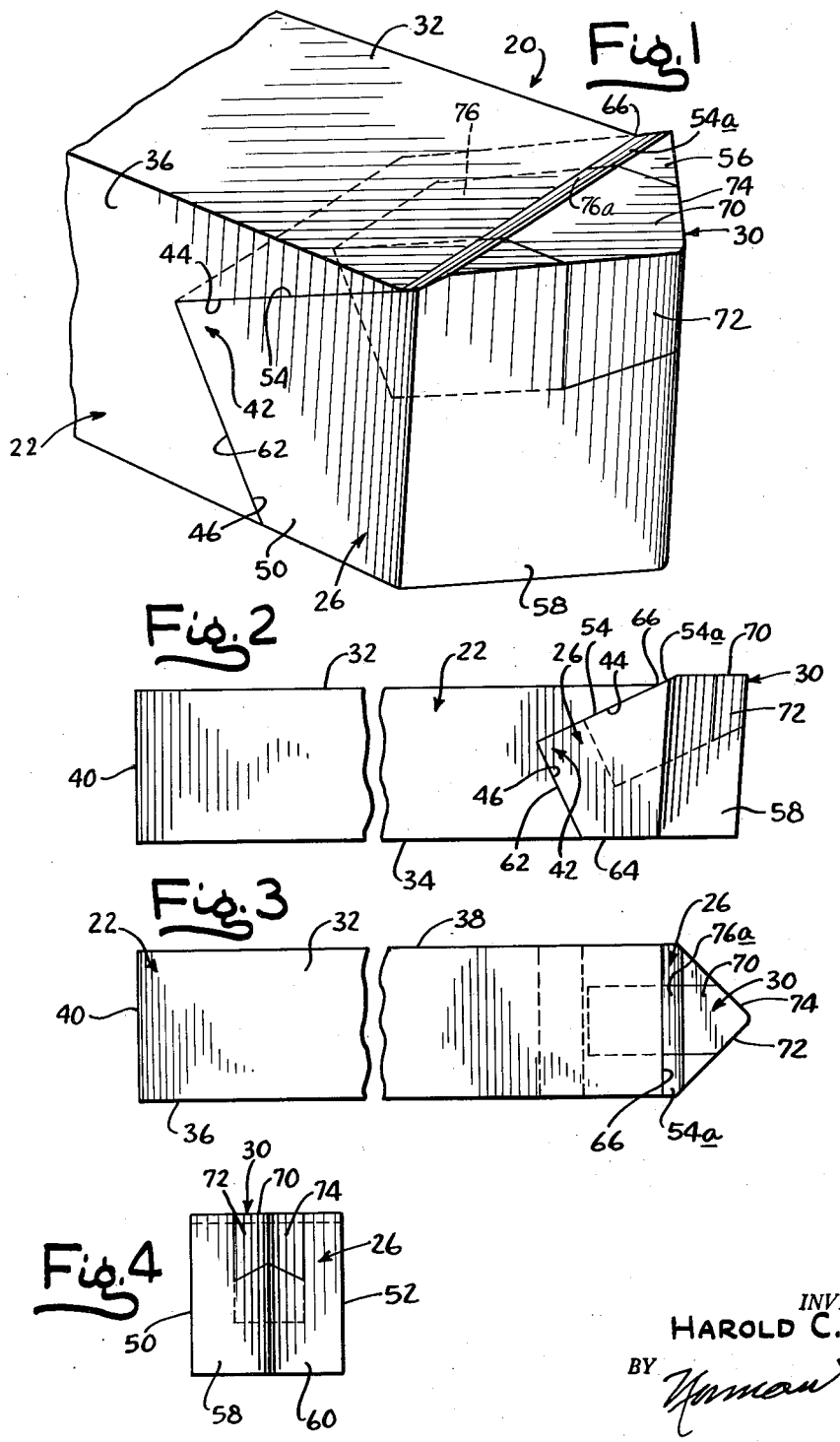
INVENTOR.
HAROLD C. MILLER
BY
ATTY.

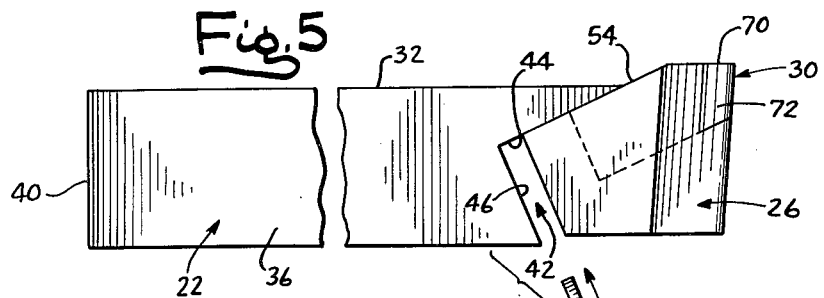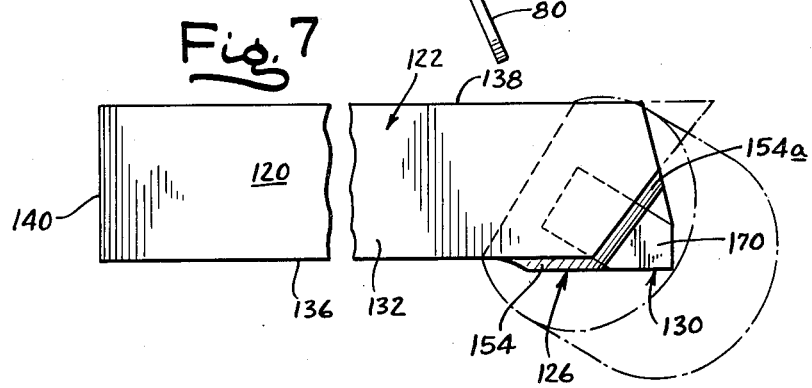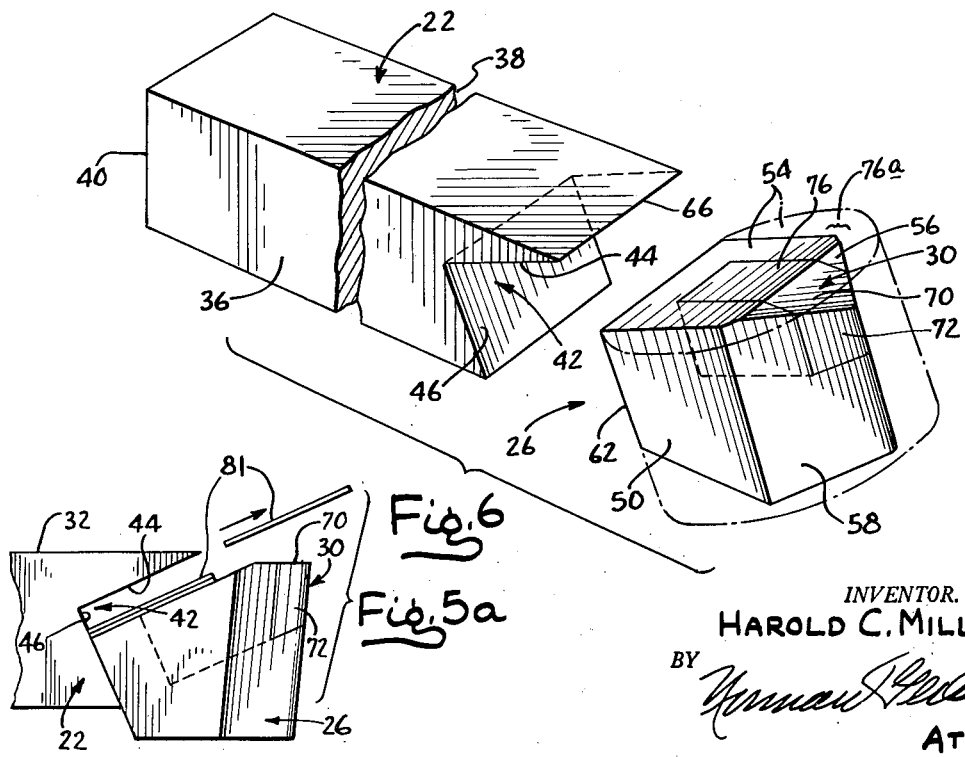

March 20, 1962 H. C. MILLER 3,025,847
COMPOSITE DIAMOND TOOL
Filed July 11, 1960 3 Sheets-Sheet 3
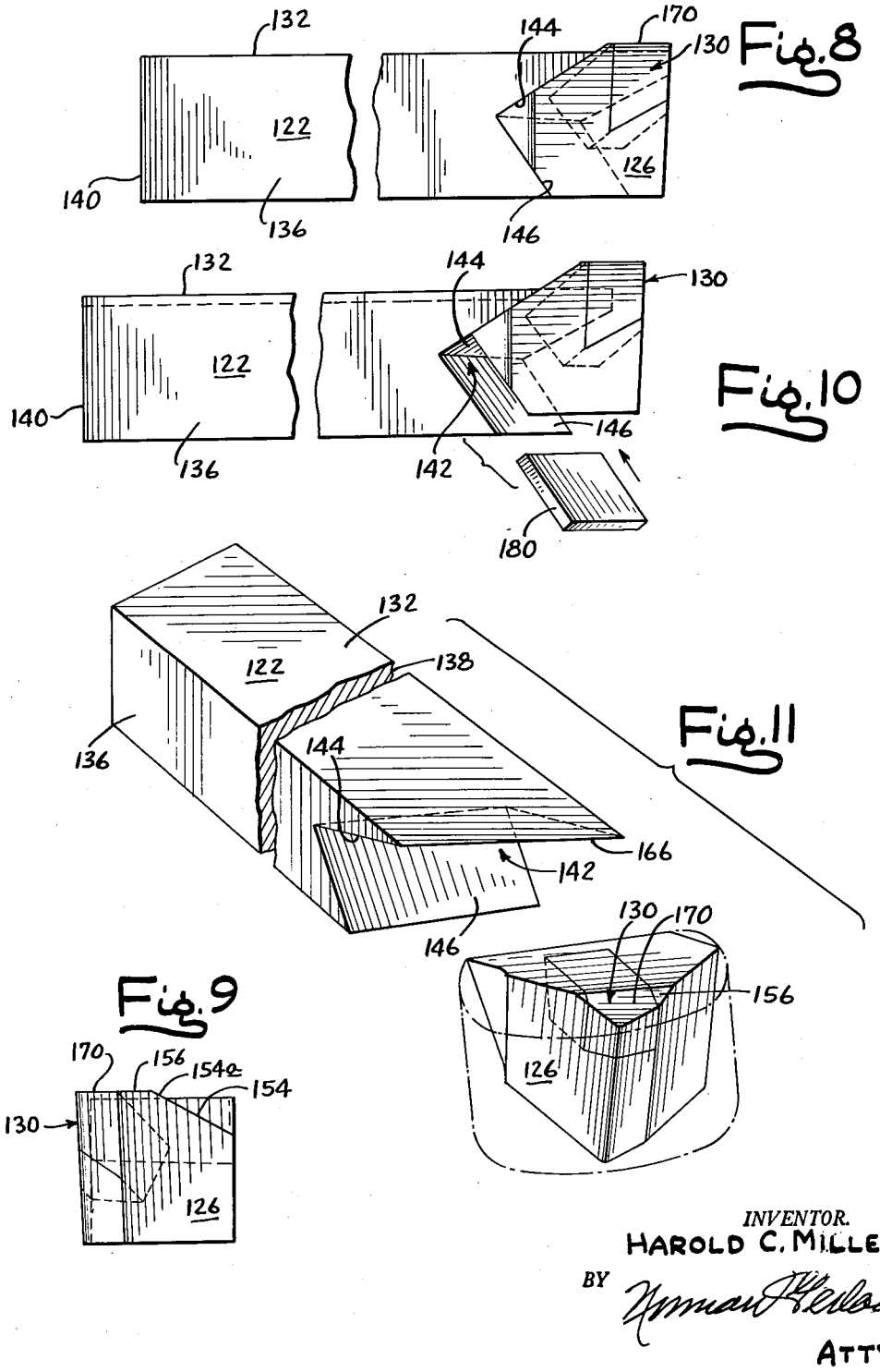
INVENTOR.
HAROLD C. MILLER
BY
ATTY.

United States Patent Office 3,025,847
Patented Mar. 20, 1962

3,025,847
COMPOSITE DIAMOND TOOL
Harold C. Miller, Chicago, Ill., assignor to Super-Cut, Inc., Chicago, Ill., a corporation of Illinois
Filed July 11, 1960, Ser. No. 41,879
7 Claims. (Cl. 125—39)

The present invention relates to diamond tools and has particular reference to a novel composite diamond-carrying tool in which the diamond is preferably precisely oriented with reference to its crystallographic axes and the axes of the tool in such a manner that the diamond will give improved performance, or perform in a predetermined and described manner when the tool is put to use in the performance of useful work.

In United States Patent No. 2,889,882, granted on June 9, 1959 and entitled "Method of and Apparatus for Dressing Grinding Wheels," it is set forth that the efficiency of a diamond tool shank, whether it be employed for the dressing of abrasive grinding wheels or for honing, boring or other similar operations, is greatest when the diamond is presented to the work in such a manner that abrasion takes place in either the (110) direction of the dodecahedron plane or parallel to the (110) direction. This patent further discloses a diamond which has been mounted in a tool shank at the forward end thereof with the diamond being so oriented, crystallographically speaking, that its (110) direction extends at a predetermined or design angle to the axis of the tool shank so that upon normal feeding operations between the shank and the work, optimum performance with a minimum of wear on the diamond will take place. Reference may be had to the above mentioned patent for a full disclosure of the theoretical considerations associated with such mounting of a diamond in a shank for the performance of useful work.

The improved tool comprising the present invention is designed as an improvement over the diamond tool shown and described in the above mentioned patent, as well as an improvement over conventional diamond tools.

The methods currently employed in the mounting of diamonds in tools are as varied as are the talents of the operators who practice them and, invariably, they are dependent upon a high degree of skill which can be attained only by long experience and upon rare judgment in visually interpreting the indications which may be found on the surface or within the internal structure of a diamond. Even when a particular stone does present visible indications of its crystallographic structure, the proper interpretation of these indications and the technique involved in handling the diamond during mounting operations leave much to chance so that, when the diamond is finally mounted, orientation within relatively small solid angles with respect to the three crystallographic axes of the stone is all that can be expected. It is not within the scope of this disclosure to outline all of the various techniques involved in present day diamond mounting operations, but it is deemed pertinent to outline at least one of the more common procedures inasmuch as a full understanding of the advantages of the present tool shank may best be had by comparison with tools which are the result of such procedure.

In the manufacture of diamond-carrying tools of the type with which the present invention is concerned, according to conventional methods, the diamond is usually totally shaped to completion and, after shaping thereof, it is inserted or wedged into a slot which has previously been sawed in the forward end of the tool shank. Thereafter the diamond is affixed in position within the slot by a soldering or brazing operation. The slot usually is rectangular and the metal immediately above and immediately below the diamond acts in the manner of a vise to exert a jaw-clamping action on the diamond to hold it securely in position.

The disadvantages of such a structure are numerous and, principal among them is the fact that for diamond-reconditioning operations the diamond must be removed from its lodged position within the slot, reconditioned separately, and then replaced in the slot. Assuming for purposes of discussion that the diamond has initially been installed within the shank slot with a reasonably accurate or effective degree of orientation, this orientation is lost when the diamond is unsoldered and it is extremely unlikely that, after new surfaces have been generated upon the diamond, the same degree of accuracy in orientation can be preserved when the diamond is replaced in the slot and resoldered therein. Equally as serious is the fact that, in the replacement of the reconditioned diamond, the soldering operation requires removal of excess metal. Few artisans possess the skill which is necessary for such solder-removing operations and, since the slightest touch of the cutting edge of the diamond with a file may render the diamond tool useless, diamond losses in this manner present an economic factor with which every tool maker must reckon.

Not only are difficulties involved in the initial installation of the diamond in a given mounting in the repolishing and reinstallation of the diamond in the tool shank, but, additionally, conventional tools are such that relapping or repolishing of the diamond in situ are precluded. Due to the presence of metal both above and below the diamond, which is necessary to create the gripping action above referred to, the fiat upper surface of the diamond, which commonly is referred to as the "table" and is the last surface on the diamond to be polished, invariably is below the upper surface of the tool shank and, therefore, cannot conveniently be reached by the polishing tool. To render this table accessible for polishing operations, the diamond must be removed from its mounting as previously described. This is true regardless of the angle of the table which may be horizontal or which may be tossed forwards or backwards to produce a negative or a positive rake respectively.

The present invention is designed to overcome the above-noted limitations that are attendant upon conventional tools and other holders and, toward this end, the invention contemplates the provision of a novel diamond tool having a shape characteristic which is such that the horizontal table portion of the diamond assumes an exposed position and is offset upwardly above the general horizontal plane of the upper surface of the shank so that no portion of the shank will interfere with the application of the table portion to a polishing tool. By such an arrangement, initial polishing, as well as subsequent polishing operations, may be resorted to with the diamond in situ within the tool.

The invention further contemplates the provision of a novel composite two-piece tool assembly including a shank proper and a shank insert, the diamond being permanently and fixedly associated with the latter so that its orientation, crystallographically speaking, bears a definite and unchanging relationship relatively to the outline of the insert or compact. The insert is provided with a fixed fiducial guide surface thereon, preferably of planar extent, and the shank is provided with a counterpart fiducial guide surface which is fashioned on the shank proper and which extends at such an angle to the axis of the shank that when the guide surface on the insert is juxtapositioned so as to cooperate therewith, the atomic planes of the diamond will assume a predetermined relationship in the tool assembly, as will also the physical outline of the diamond. The guide surface on the shank is inclined generally forwardly and upwardly of the shank and fixation of the insert to the shank is effected by a soldering or equivalent bonding operation, the parts being so disposed, when thus united, that the table portion of the diamond assumes an exposed horizontal position above the level of the general plane of the upper face of the shank as previously stated. This guide surface on the shank overlies the guide surface on the insert, as well as overlying a major portion of the bulk of the diamond, and affords the necessary reaction support for the insert and diamond when the diamond is applied to the work. Because of the fact that the general inclination of the guide surface on the shank is forwardly and upwardly, it is possible to adjust the position of the insert bodily as a whole without disturbing the orientation of the diamond or appreciably affecting its overlying reaction support, and in such a manner as to elevate the level of the table portion of the diamond, this being accomplished by melting the soldered bond and sliding the insert forwardly and upwardly bodily along the guide surface of the shank until the desired table elevation is attained. Thus, at such time as the diamond has become worn to such an extent that it is no longer possible to repolish the table portion due to interference by the shank, the position of the insert relative to the shank may be adjusted in the manner indicated above and the table portion of the diamond brought to an exposed position where polishing operations may be conveniently carried out, while at the same time a major portion of the bulk of the diamond is in its underlying position beneath the overlying guide surface.

Alternatively, and because the guide surface on the shank overlies the insert and affords the necessary thickness of metal to provide a reaction support for the insert as stated above, it is possible constructively to elevate the table portion of the diamond for exposure purposes by grinding the upper surface of the shank to a level below that of the table portion of the diamond, such a procedure being applicable when the height of the shank is not critical.

The provision of a composite diamond tool of the character briefly outlined above being among the principal objects of the invention, numerous other objects and advantages will become readily apparent as the nature of the invention is better understood.

In the accompanying three sheets of drawings forming a part of this specification, two illustrative embodiments of a composite tool embodying the principles of the present invention have been shown.

In the drawings:

FIG. 1 is a fragmentary perspective view of a composite tool constructed in accordance with the principles of the present invention;

FIG. 2 is a side elevational view of the tool shown in FIG. 1;

FIG. 3 is a top plan view of the tool shown in FIG. 1;

FIG. 4 is a front end view of the tool shown in FIG. 1;

FIG. 5 is a side elevational view, somewhat schematic in its representation, of the tool shown in FIG. 1 and illustrating the manner in which the outline of the composite tool may be altered by rearrangement of the sections or parts which cooperate to make up the same;

FIG. 5a is a schematic side elevational view, similar to FIG. 5, illustrating but another manner in which the outline of the tool may be altered;

FIG. 6 is an exploded perspective view illustrating the outlines of the principal parts of the composite tool of FIG. 1;

FIG. 7 is a top plan view, similar to FIG. 1, but showing another form of composite tool constructed according to the present invention;

FIG. 8 is a side elevational view of the tool shown in FIG. 7;

FIG. 9 is a front elevational view of the tool shown in FIG. 7;

FIG. 10 is a schematic side elevational view, similar to FIG. 5, but with reference to the tool shown in FIGS. 7 to 9 inclusive; and FIG. 11 is an exploded perspective view similar to FIG. 6 but with reference to the tool shown in FIGS. 7 to 9 inclusive.

Referring now to the drawings in detail, two typical diamond-carrying tools constructed according to the present invention have been illustrated purely for exemplary purposes. One of these tools is shown in FIGS. 1 to 6, inclusive, and the other is shown in FIGS. 7 to 11, inclusive, the former being designated in its entirety at 20 and the latter being designated in its entirety at 120.

The tool 20 is of a composite nature and it is comprised of two principal parts, namely a shank proper 22 which may be formed from a length of shank stock which is generally rectangular in transverse cross section, and a diamond-carrying shank insert 26. The two parts 22 and 26 are assembled upon each other and are releasably maintained in their assembled relationship by a silver soldering operation or its equivalent to produce the completed tool 20.

The diamond or cutting tool proper is designated in its entirety at 30 and is partially embedded in the insert 26. In the completed tool it assumes an operative cutting position at the extreme forward end of the tool shank with its crystallographic axes precisely oriented relative to the shank outline so that the cutting edge or radius thereof will engage the work at a predetermined cutting angle and at the same time offer to the work the desired cutting qualities. The purpose of maintaining the two parts 22 and 26 releasably assembled is to enable them to be relocated, each relatively to the other, by the use of shims in a manner and for a purpose that will be made clear presently.

For convenience of description and in the interests of clarity, throughout this specification and in the claims appended hereto, the composite assembly including the shank proper 22, the shank insert 26 at the forward end of the shank proper, and the diamond 30 which is partially embedded in the shank insert 26, will be referred to as the tool or tool assembly. The shank insert 26 will be referred to as the insert. The shank proper 22 will, in the interests of brevity, be referred to simply as the shank.

Although the shank 22 is shown as having been formed from shank stock which is rectangular in transverse cross section, it is to be understood that the disclosure is merely exemplary and the essential features of the invention are not altered when the shank is otherwise polygonal, cylindrical or otherwise curved in transverse cross section.

The rectilinear shank 22 is of elongated design and is provided with a flat horizontal top face 32, a flat horizontal bottom face 34, and vertical side faces 36 and 38. The rear end face 40 of the shank 22 is vertical. Again, for descriptive purposes herein, directional references, unless otherwise specified, or otherwise related referencewise, will refer to directions in space, it being assumed that the tool shank 20 will be applied to the work with its upper face 32 extending in a horizontal plane in space.

The forward end of the shank 22 is provided with a transversely extending notch 42 (FIGS. 5 and 6) which is V-shaped in cross section and presents a flat, downwardly facing, forwardly and upwardly inclined face 44 and a flat, forwardly and downwardly inclined face 46. The two faces 44 and 46 extend at a right angle to each other and each face extends at a right angle to the side faces 36 and 38.

The insert 26 is nested within the notch in a manner that will be made clear presently and is shown in a detached condition in FIG. 6 where the outline thereof is clearly visible. The insert 26 is provided with vertical trapezoidal faces 50 and 52 which are coplanar with, and constitute extensions of, the side faces 36 and 38 respectively of the shank 22. The insert 26 is further formed with an upwardly facing forwardly and upwardly inclined rectangular upper face 54, a triangular horizontal face 56, a pair of rectangular forwardly and upwardly inclined front faces 58 and 60 which converge toward each other, a rearwardly and upwardly inclined face 62, and a horizontal bottom face 64, all of the faces being planar.

The two inclined faces 54 and 62 extend at a right angle to each other and these two faces are commensurate in size and outline to the size and outline of the faces 44 and 46, respectively, of the notch 42 provided in the shank 22. The faces 54 and 62 are fixedly secured to the faces 44 and 46, respectively, and are coextensive therewith, the union preferably being made by a silver soldering operation. The extent of the inclined face 54 in a direction generally lengthwise of the shank 22 is somewhat greater than the length of the forwardly and upwardly inclined face 44 of the notch 42 and thus, when the two parts 22 and 26 are assembled upon each other, a narrow section 54a of the face 54 remains exposed and projects forwardly and upwardly beyond and overhangs the transverse edge 66 which exists between the juncture of the faces 32 and 44.

The insert 26 contains the diamond 30 which is partially embedded therein near the upper regions of the latter and adjacent the forward edge thereof. The diamond exhibits an exposed table portion 70 which is coplanar with the triangular face 56, and it exhibits exposed undercut flanks 72 and 74 (FIG. 4) which are coplanar with the faces 58 and 60, respectively. The diamond 30 also exhibits a face 76 (FIG. 6) which is exposed relatively to the face 54 and with which it is coplanar. Only a small area 76a (FIG. 3) of the face 76 is exposed when the parts 22 and 26 are assembled. This area has been bracketed in FIG. 6 to indicate the normal width thereof.

As previously set forth, the diamond 30, when the parts 22 and 26 are assembled, assumes a position in the composite tool 20 with its crystallographic axes precisely oriented with respect to the tool shank outline so that predetermined cutting action will be effected when the same is applied to the work. This orientation of the diamond in the completed shank is due partly to its position in the insert 26 and partly to the position the insert 26 assumes relatively to the outline of the shank.

Although the method by means of which the tool 20 is formed constitutes no part of the present invention, such method forming the subject matter of my copending United States patent application, Serial No. 41,832, filed on July 11, 1960, and entitled "Method of Mounting Diamonds in Tool Shanks and Other Holders," it is deemed pertinent for a better understanding of the present invention briefly to outline herein certain techniques which underlie the construction and assembly of the constituent parts of the composite tool 20. The insert 26 is originally in the form of a molded cylindrical slug and the diamond is given in approximate position in the slug with a limited portion of the diamond being exposed so that it may be subjected to an X-ray diffraction procedure wherein the relationship of its atomic structure relatively to the slug may be ascertained in chart form. The slug is then machined on the basis of the chart in a predetermined manner to establish fiducial reference faces on the slug which extend parallel to the corresponding atomic planes of the diamond. These fiducial reference faces correspond to the two faces 54 and 62 of the insert which is ultimately machined from the slug after the latter has been assembled upon the shank 22. Taking into consideration the final desired position of the diamond 30 in the completed tool 20, the two sides 46 and 44 of the natch 42 are cut in the shank 22 on the basis of design angles which are set into the scales of a goniometer vise. The sides 46 and 44 of the notch 42 constitute a seat for the reference faces 62 and 54 of the slug so that when the slug is assembled upon the notched shank 22 by placing these fiducial faces in face-to-face contact respectively, the diamond will assume the desired position relative to the shank outline. Thereafter, the slug, while in position on the shank 22, as well as any portions of the shank 22 which may require shaping, is shaped to produce the final tool outline. Reference may be had to my above-mentioned copending application for a more detailed understanding of the method involved in producing the composite tool 20 including an illustration of the slug from which the insert 26 is machined.

As stated above, the insert 26 is shaped while in position on the shank 22 and the final shaping operation resides in grinding and polishing the table portion 70 of the diamond, together with its coplanar surface 56 on the insert. Frequently these coplanar surfaces will extend horizontally and will be parallel to the longitudinal axis of the shank 22, as well as lying above the uppermost edge or face of the shank as shown in the drawings. However, these coplanar surfaces may deviate by small rake angles from the horizontal but, in any event, the extended plane thereof will not intersect the body of the shank. Thus, in either case, the shank will offer no interference to the polishing tool, either during initial polishing of the table 70 or during reconditioning of the diamond so that these operations may be effected with the diamond in situ within the tool 20.

Under certain circumstances, it may be necessary to raise the over-all level of the diamond, and consequently of the table portion 70 thereof, before the latter can be repolished without interference by the shank 22 to the polishing tool. This may be accomplished either by grinding the upper face 32 of the shank 22 with the insert 26 and its embedded diamond in situ, thus, in effect raising the level of the diamond table 70. Such a procedure may be resorted to in an instance where the height of the shank is not specified. However if the height of the shank 22 is specified, it is then necessary to melt the silver solder which bonds the insert in place by the application of heat and then slide the insert 26 forwardly and upwardly as illustrated in FIG. 5, utilizing the face 44 of the notch 42 as a guide surface to, in part, maintain the orientation of the insert 26 in space. Utilizing a flat shim such as has been shown at 80, or utilizing plural shims, the thus raised insert may again be soldered in position and the notch face 46 will serve to complete the orientation of the insert 26 so that it corresponds with the initial orientation thereof in the tool 20. Since the purpose of the rearrangement of the insert 26 with respect to the shank 22 is to raise the level of the table portion 70 of the diamond 30, it follows that the upper face 44 of the notch 42 will always be disposed at such an angle that it is inclined generally forwardly and upwardly, albeit, not necessarily directly forwardly as in the illustrated form of the tool 20.

As previously stated, the upper face 44 of the notch 42 constitutes a guide surface for preserving the orientation of the insert when a forward and upward readjustment thereof is made. This guide surface also performs a second function in that it establishes a reaction surface for assimilating the upward thrust of the diamond when the cutting point or edge of the latter is applied to the work. Where the diamond is provided with an exposed face, such as has been shown in FIG. 6 at 76, and which is coplanar with the face 54 of the insert 26, such face 76 will receive direct reaction support from the overlying guide surface 44. Where the diamond is more completely embedded in the insert 26, a portion of the material of the insert may overlie the diamond and extend between it and the guide surface. In such an instance, the diamond will receive reaction support from the overlying guide surface indirectly through the medium of the overlying material of the insert.

It is to be noted that due to the fact that a major portion of the bulk of the diamond is embedded in the material of the insert 26, the diamond will receive support on many sides thereof. The diamond 30 illustrated herein is merely exemplary of a possible diamond shape and it will be understood that diamonds having an infinite variety of shapes will be encountered and employed in actual practice. For example, many usable diamonds will be generally spherical in design so that when they are embedded in inserts and applied to tool shanks in accordance with the principles of the present invention, the sockets created for them in the insert at the time of their embedment and by virtue of such embedment will have wall surfaces that encompass the diamond and face in many directions, thus giving lateral support to their contained diamonds in practically all directions. In nearly every instance, lateral support of the diamond in both transverse directions will be attained.

In the modified form of tool shown in FIG. 5a wherein the shank 22 and insert 26 remain identical with the form of tool previously described, the slug and shank are assembled with a plurality of shims 81 interposed between the face 44 of the notch and the face 54 on the slug so that after the grinding and polishing operations which are performed on the slug in situ, the table portion 56 of the insert will remain above the level of the upper face 32 of the shank. To raise the level of the table portion when wear has taken place, shim removal operations may be resorted to by solder removal and application in the manner previously described.

In FIGS. 7 to 11, inclusive, a modified form of tool 120 has been illustrated, this form of tool likewise embodying the principles of the present invention and being susceptible to manufacture according to the method described in my copending application above referred to. The tool 120 is comprised of the same principal parts as is the tool 20 previously described and, therefore, to avoid needless repetition of description, similar characters of reference but of a higher order have been applied to the parts in FIGS. 7 to 11, inclusive, which correspond to similar parts in FIGS. 1 to 6, inclusive.

The tool 120 is of a composite nature and includes a shank proper 122, a shank insert 126, and a diamond or cutting tool proper 130. The insert 126 is similar to the insert 26 and, in fact, is substantially identical therewith except for the fact that in the final shaping operation with the insert in position on the shank 22, different relief areas are milled from the original slug from which the insert is formed. The insert 126 is also oriented differently in the composite tool 120.

In connection with the tool 20, cutting of the notch 42 is predicated upon design angles of zero magnitude for two of the coordinate axes of the shank, and upon a design angle of positive value for the third coordinate axis. The notch thus extends transversely across the shank with the bottom edge thereof extending at a right angle to the shank sides 36 and 38. In connection with the tool 120 it is desired that the diamond be displaced laterally from the longitudinal axis of the shank and that its effective cutting edge project laterally beyond the sides of the shank. Cutting of the notch 142 is, therefore, predicated upon positive design angles for all three coordinate axes of the shank.

The previously described advantages which are present in connection with the composite tool 20 are equally applicable to the composite tool 120. The upper surface 132 of the shank 122 may be ground down below the level of the table 170 as indicated in dotted lines in FIG. 10 or, alternatively, the insert 126 may be shimmed outwardly and upwardly utilizing a shim such as has been shown at 180 and as previously described in connection with the shimming of the insert 26 in the assembly 20. Such upward movement of the insert 126 bodily as a whole will bring the table portion 170 of the diamond 130 to the desired level above the uppermost face 132 of the shank 122 where, after the insert has been resoldered in place on the shank, repolishing operations may be resorted to.

The invention is not to be limited to the exact arrangement of parts shown in the accompanying drawings or described in this specification as various changes in the details of construction may be resorted to without departing from the spirit of the invention. For example, although the notch 42 in the shank 22 has been shown and described as being cut in such a manner that the guide surface for the insert overlies the cooperating guide surface on the insert, it is within the purview of the invention to shape the shank so that the guide surface thereon will serve to project the table portion of the diamond horizontally outwardly beyond a side surface of the shank to expose the same for initial polishing or subsequent repolishing operations if desired. In other words, projection of the diamond under the influence of the two planar guide surfaces may be effected in any direction and may be related to any external face of the shank. Only insofar as the invention has particularly been pointed out in the accompanying claims is the same to be limited.

Having thus described the invention what I claim as new and desire to secure by Letters Patent is:

1. A diamond tool comprising an elongated shank and a diamond-carrying metal insert fixedly mounted at the forward end of the shank, the forward end region of the shank being cut inwardly of the shank body to provide a downwardly facing, forwardly and upwardly inclined, planar guide surface, said insert being provided with a cooperating planar guide surface in face-to-face contact with said guide surface on the shank and projecting outwardly beyond an edge of the latter so as to overhang the same, releasable bonding means fixedly securing said guide surface in their face-to-face relationship, and a diamond cutting element having a portion thereof embedded in the insert and projecting beneath the forwardly and upwardly inclined guide surface on the shank, said diamond cutting element presenting a flat exposed table portion which presents itself in a plane which is offset outwardly beyond the extended confines of the shank a sufficient distance to permit application of said table portion to a polishing tool without physical interference by said shank.

2. A diamond tool comprising an elongated metal shank and a diamond-carrying metal insert fixedly mounted at the forward end of the shank, said shank presenting a horizontally extending top surface, the forward end region of said shank being undercut to provide a downwardly facing forwardly and upwardly inclined guide surface, said insert being provided with a cooperating forwardly and upwardly inclined guide surface in fact-to-face contact with said downwardly facing guide surface and projecting forwardly and upwardly beyond the forward edge of the latter so as to overhang the same, said guide surfaces being releasably bonded to each other in their face-to-face relationship, and a diamond cutting element having a portion thereof embedded in the metal of said insert and projecting beneath the downwardly facing, forwardly and upwardly inclined guide surface on the shank, said diamond cutting element presenting a flat exposed substantially horizontal table portion above the level of said horizontally extending top surface of the shank.

3. A diamond tool comprising an elongated metal shank and a diamond-carrying metal insert fixedly mounted at the forward end of the shank, said shank presenting a horizontally extending outer surface, the forward end region of said shank being undercut to provide an open generally forwardly facing notch therein which extends transversely of the shank, said notch presenting planar side surfaces having wide divergence, said insert being provided with a pair of adjacent planar faces which diverge at an angle commensurate with the angle of divergence of said planar side surfaces of the notch, said insert being seated within said notch with the adjacent planar faces thereof in face-to-face contact with the side surfaces respectively of the notch, one of said planar faces on the insert, having a major portion of its bulk underlying said downwardly facing guide surface, overhanging the outer edge region of the side surface of the notch with which it is in face-to-face contact so as to cause a portion of the insert to project outwardly beyond the physical confines of the shank, and a diamond cutting element partially embedded in said insert and having its cutting edge exposed outwardly from said projecting portion of the insert, said adjacent planar faces of the insert and the side surfaces of the notch with which they are in face-to-face contact being releasably bonded together.

4. A diamond tool as set forth in claim 3, wherein said planar side surfaces of the notch extend at an angle of substantially 90° to each other.

5. A diamond tool as set forth in claim 1 and wherein the portion of the diamond cutting element which projects beneath the forwardly and upwardly inclined guide surface on the shank is provided with a flat surface which is coplanar with the guide surface on the insert and which also is in face-to-face contact with the guide surface on the shank.

6. A diamond tool as set forth in claim 3 and wherein the portion of the diamond cutting element which projects beneath the downwardly facing, forwardly and upwardly inclined guide surface on the shank is provided with a flat surface which is coplanar with the forwardly and upwardly inclined guide surface on the insert and also is in face-to-face contact with the downwardly facing, forwardly and upwardly inclined guide surface on the shank.

7. A diamond tool as set forth in claim 3 and wherein the insert embodies a socket in which the diamond cutting element is embedded and such socket has on opposite sides of the element oppositely disposed side wall surfaces which confine the element therebetween and positively prevent it from shifting in either direction transversely of the insert.

References Cited in the file of this patent
UNITED STATES PATENTS

| | | |
|---|---|---|
| 2,351,916 | Braun | June 20, 1944 |
| 2,704,881 | Barrett | Mar. 29, 1955 |